Oct. 18, 1966  N. G. C. MEYER  3,279,801
IMPLEMENTS FOR SPREADING POWDERED OR GRANULAR MATERIALS
Filed Dec. 28, 1964  4 Sheets-Sheet 1

INVENTOR.
NICOLAAS G. C. MEYER
BY
Mason, Mason & Albright
Attorneys

Oct. 18, 1966   N. G. C. MEYER   3,279,801
IMPLEMENTS FOR SPREADING POWDERED OR GRANULAR MATERIALS
Filed Dec. 28, 1964   4 Sheets-Sheet 3
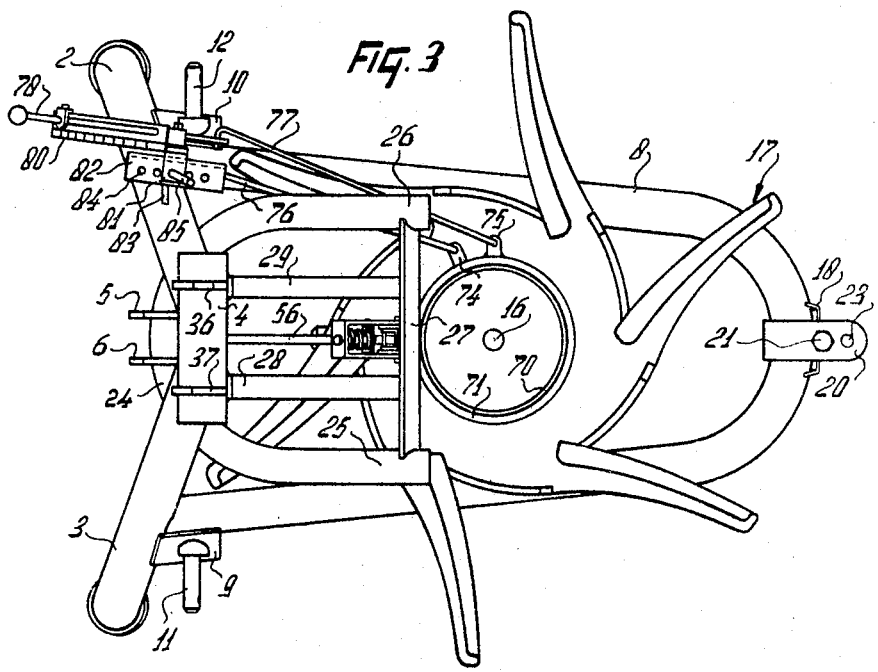
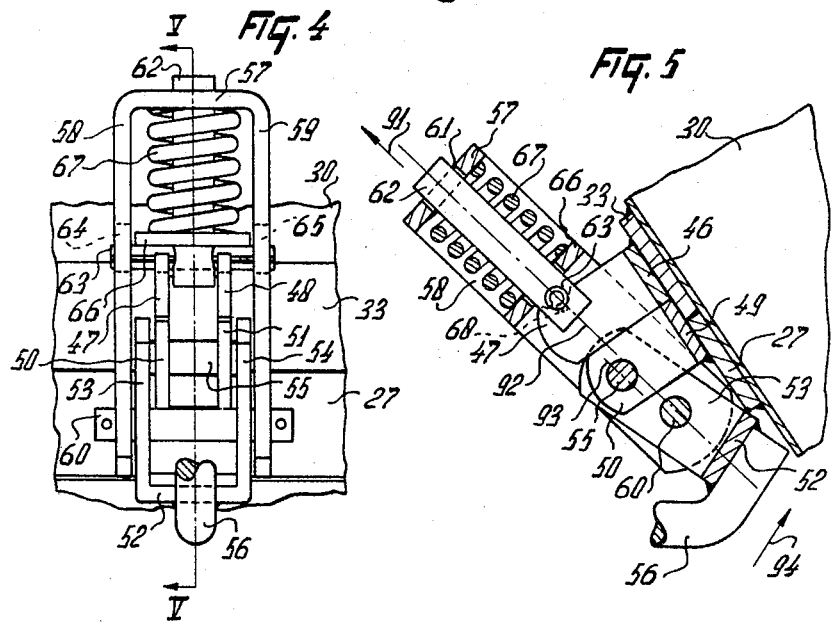
INVENTOR.
NICOLAAS G. C. MEYER
BY
Mason, Mason & Albright
Attorneys 3,279,801
IMPLEMENTS FOR SPREADING POWDERED OR
GRANULAR MATERIALS
Nicolaas Gerardus Cornelis Meyer, Maasland, Netherlands, assignor to C. van der Lely N.V., Maasland, Netherlands, a Dutch limited-liability company
Filed Dec. 28, 1964, Ser. No. 421,228
Claims priority, application Netherlands, Jan. 17, 1964, 6,400,304
29 Claims. (Cl. 275—15)

This invention relates to implements for spreading powdered or granular materials over the ground, such implements being of the kind comprising a frame movable over the ground, a container for material to be spread and a spreading member for the material.

An object of the invention is to enable those parts of such implements that require regular cleaning to be rendered readily accessible for that purpose.

According to the invention, there is provided an implement of the kind set forth, wherein the container is displaceably mounted on the frame in such a way that it can be retained in either of two different positions relative thereto, the container being located at a greater distance from the spreading member in one of said positions than in the other.

Figure 1:
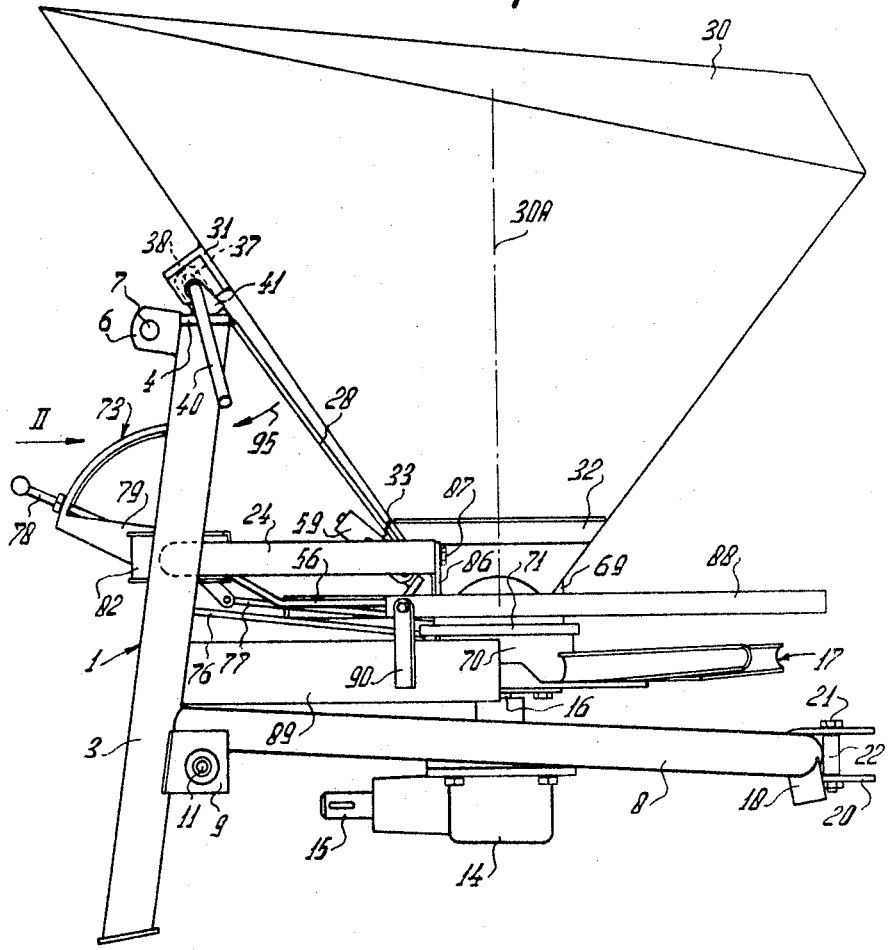
Figure 2:
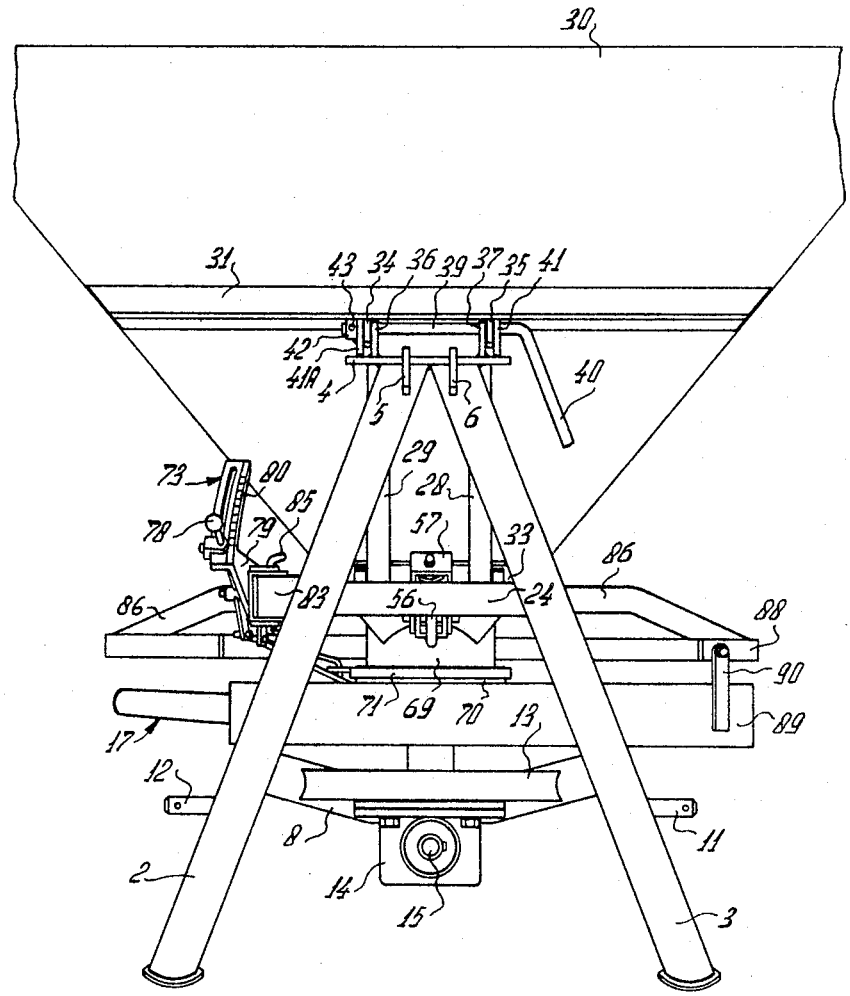
Figure 6:
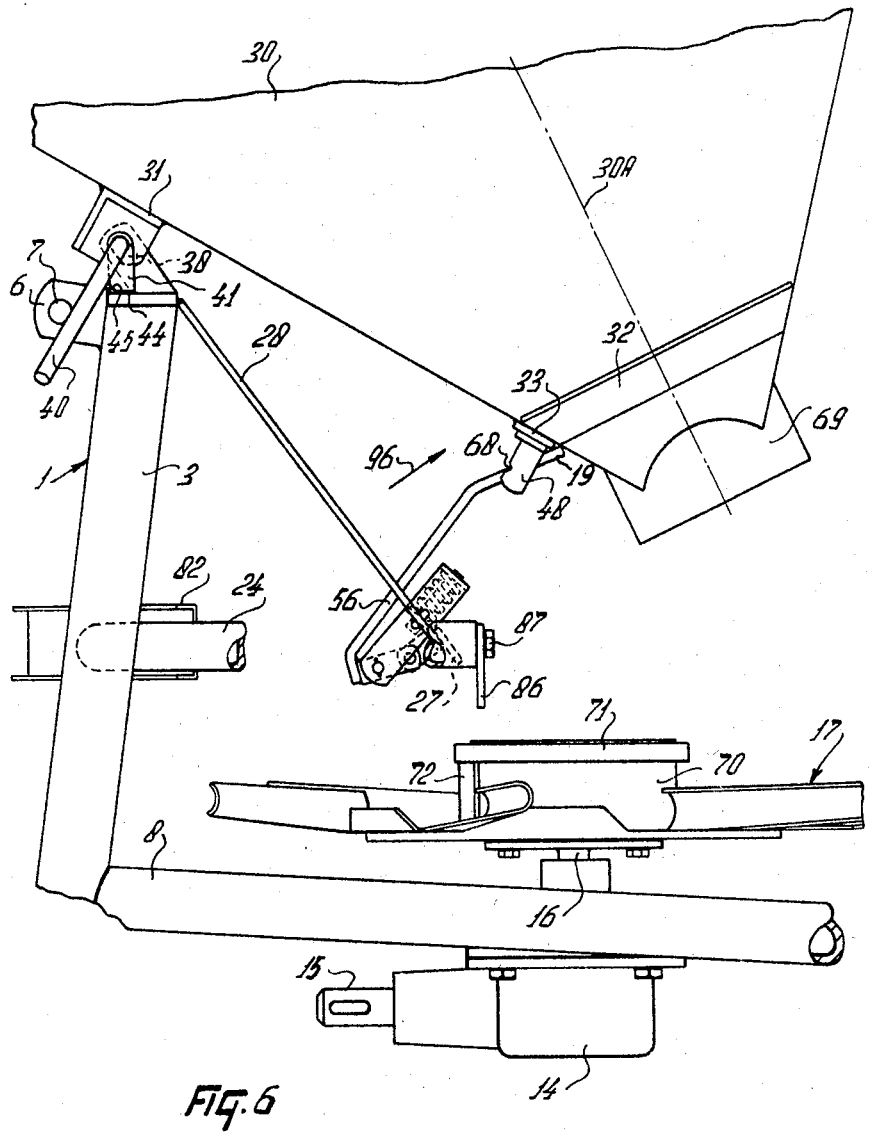

For a better understanding of the invention, and to show the same may be carried into effect, reference will now be made, by way of example, to the accompanying drawings, in which:

FIGURE 1 is a side elevation of a spreading implement in accordance with the invention, FIGURE 2 is a front elevation of the implement of FIGURE 1 as seen in the direction indicated by the arrow II of FIGURE 1, FIGURE 3 is a plan view of the implement of FIGURES 1 and 2 with certain upper parts thereof removed, FIGURE 4 is a front elevation, to an enlarged scale, showing part of the implement of FIGURES 1 to 3 in greater detail, FIGURE 5 is a section taken on the line V—V of FIGURE 4, and FIGURE 6 is a scrap side elevation corresponding to FIGURE 1 but to an enlarged scale showing certain parts of the implement occupying different relative positions to those illustrated in FIGURE 1.

Referring to the drawings, the spreading implement which is illustrated has a frame generally indicated by the reference numeral 1 that includes two main beams 2 and 3 which, as can be seen in FIGURE 2, are arranged in inverted V-shaped relationship with their uppermost ends rigidly interconnected by a horizontal plate 4. A vertically disposed lug 5 is secured to the uppermost end of the beam 2 and to the plate 4 and projects forwardly of the implement. A similar lug 6 is secured to the uppermost end of the beam 3 and to the plate 4 in parallel and adjacent relationship to the lug 5. The two lugs 5 and 6 are formed with a pair of horizontally aligned holes 7. The opposite ends of a beam 8 which is U-shaped when seen in plan view (FIGURE 3) are secured to the rear sides of the two beams 2 and 3 towards the lowermost ends thereof. The plane which contains the beam 8 is gently inclined to the horizontal. Strengthening plates 9 and 10 reinforce the junctions between the beam 8 and the two beams 2 and 3 and horizontally aligned pins 11 and 12 project in relatively opposite directions from the plates 9 and 10 respectively. A transverse beam 13 extends between the two limbs of the U-shaped beam 8 and supports a gear casing 14 from which a keyed input shaft 15 projects in the intended direction of travel of the implement. An output shaft 16 projects vertically above the gear casing 14.

A spreading member in the form of a rotary ejector 17 is secured to the uppermost end of the output shaft 16 and takes the form of a substantially horizontal disc having six equiangularly spaced peripheral spreading blades. A foot 18 is fastened to the base of the U-shaped beam 8 and a U-shaped connecting bracket 20 is bent around said base at the location of the foot 18 in such a way that its limbs project horizontally towards the rear of the implement. A vertical retaining bolt 21 whose shank is surrounded by a spacing sleeve 22 is entered through the limbs of the bracket 20 to maintain it in its appointed position and the free ends of the two limbs of the bracket are formed with a pair of vertically aligned holes 23. A U-shaped supporting beam 24 is fastened to the two beams 2 and 3 above the beam 8 in such a way that its two limbs 25 and 26 project substantially horizontally to the rear from the two beams 2 and 3 relative to the intended direction of travel of the implement. As can be seen in the drawings, it is the curved base of the beam 24 that is fastened to the beams 2 and 3. A strip 27 interconnects the free ends of the two limbs 25 and 26 and two further strips 28 and 29 extend obliquely between the strip 27 and the rearmost edge of the horizontal plate 4. The beams 2, 3, 8 and 24 are all of tubular construction.

A container in the form of a hopper 30 is mounted on the frame 1 and has a stiffening bar 31 of L-shaped cross section fastened to its leading side so as to extend horizontally with one of the limbs of the L projecting perpendicularly from the said side. The two lateral sides of the hopper 30 are provided with stiffening strips 32 that extend substantially horizontally towards the lowermost ends of said walls. The leading ends of the two strips 32 are interconnected by a further similar stiffening strip 33 that extends horizontally across the front side of the hopper 30 at the same level as the strips 32.

Two apertured lugs 34 and 35 (FIGURE 2) project downwardly from the bar 31 lie alongside apertured lugs 36 and 37 which project upwardly from locations towards the opposite ends of the plate 4. The apertures in the lugs 36 and 37 take the form of slots 38 (FIGURES 1 and 6). A horizontal pivot pin 39 having a handle 40 at one end is entered through the slots 38 and through the holes in the lugs 34 and 35. A lifting arm 41 is rigidly secured to the pin 39 adjacent the handle 40 and a similar arm 41A is secured to the pin 39 at the relatively opposite end thereof. The arm 41A is rigid with a ring 42, a small transverse pin 43 being entered through the ring 42 and through a matching bore in the pin 39 to rigidly connect the arm 41A to that pin. As can be seen in FIGURE 6 of the drawings, the ends of the arms 41 and 41A remote from the pin 39 have straight edges 44 each of which is connected to one relatively perpendicular edge of the corresponding arm by a 90° rounded-off corner 45.

The stiffening strip 33 has the base of a U-shaped bracket 46 (FIGURES 4 and 5) secured to it, the said bracket having two limbs 47 and 48 that project obliquely downwards. The bracket 46 affords a clamping member and a further U-shaped bracket 49, affording another clamping member, has its base secured to the strip 27. As can be seen in FIGURES 4 and 5 of the drawings, the bracket 49 has limbs 50 and 51 that are disposed immediately below, and in contact with, the limbs 47 and 48 respectively of the bracket 46. A broader forked bracket 52 of U-shaped configuration has limbs 53 and 54 that are pivotally connected to the limbs 50 and 51 of the bracket 49 by a horizontal pivot pin 55. One end of a lever 56 is welded or otherwise rigidly secured to the base of the bracket 52. A larger and broader inverted U-shaped bracket 57 has limbs 58 and 59 that are pivotally conncected to the limbs 53 and 54 of the bracket 52 by a horizontal pivot pin 60 that is entered through the last-mentioned limbs at a location between the base of the bracket 52 and the pivot pin 55. The uppermost base of the bracket 57 is formed with a hole 61 through which one end of a pin 62 is entered. The lowermost opposite end of the pin 62 is formed with a bore through which a horizontal transverse pin 63 is entered. The opposite ends of the transverse pin 63 are lodged in slots 64 and 65 formed in the limbs 58 and 59 respectively of the bracket 57.

A strong compression spring 67 surrounds the pin 62 and bears between the base of the bracket 57 and a washer 66 which is mounted on that pin so as to lie against the transverse pin 63. The limbs 47 and 48 of the bracket 46 are formed on their upper edges with V-shaped notches 68 (FIGURE 5) into which the transverse pin 63 is resiliently urged by the spring 67. The brackets 52 and 57 together with the members associated therewith and the spring 67 form parts of a clamping mechanism.

The lowermost end of the hopper 30 takes the form of a cylindrical outlet portion 69 which is surrounded by a slightly larger cylindrical outlet member or annulus 70 in which a number of outlet ports (not shown) are formed. The lowermost edge of the annulus 70 bears on a central region of the rotary ejector 17 and has its uppermost end surrounded by a masking member or ring 71 that carries a number of masking or shutter plates 72 that are arranged to cooperate with the outlet ports in the annulus 70 to vary the effective cross-sectional area of the latter. The annulus 70 is trunable about its own longitudinal axis on the rotary ejector 17 but is prevented from making undesired movements by an adjusting member connected to the frame 1 and generally indicated by the reference numeral 73. The annulus 70 carries a projecting lug 74 and the ring 71 carries a projecting lug 75, the two lugs 74 and 75 being linked by respective coupling rods 76 and 77 to said adjusting member 73. The end of the rod 77 remote from the lug 75 is coupled to an adjusting lever 78 that is pivotally mounted in a holder 79 of the member 73. A scale 80 is marked alongside a slot of the holder 79 and the lever 78 carries a pointer which can be moved to any desired mark on the scale 80 and be retained there by a clamp. The holder 79 is rigidly secured to a U-shaped bracket 81 that is slidable along a guide 82 whose cross section matches the shape of the bracket 81 and which is rigidly secured to the frame 1 with the aid of a strip 83. The guide 82 is formed with five pairs of vertically aligned holes 84 and the bracket 81 is formed with a single pair of vertically aligned holes that can be slid into register with any chosen one of the pairs of holes 84. A vertical locking pin 85 is provided for entry through the registering holes to retain the bracket 81 in a chosen setting relative to the guide 82.

Brackets 86 (FIGURES 1 and 2) are fastened to the free ends of the limbs 25 and 26 of the supporting beam 24 and carry a screening strip 88. A further broader screening strip 89 is fastened to the beams 2 and 3 at the same level as the rotary ejector 17, one end of the strip 89 being rigidly connected to the strip 88 by a vertical strip 90.

In the use of the implement which has been described, it is connected to the three-point lifting device of an agricultural tractor or other supporting and propelling vehicle, the free ends of the lower lifting links of said device being engaged with the pins 11 and 12 and the free end of the adjustable upper lifting link of the device being engaged with the lugs 5 and 6 by means of a horizontal pivot pin entered through the holes 7. The input shaft 15 is placed in driven connection with the power take-off shaft of the same tractor or other vehicle by means of an intermediate transmission shaft and universal joints so that the ejector 17 can be rotated to spread powdered or granular material, such as artificial fertilizer, that reaches it from the hopper 30. The material reaches the ejector 17 through the aforementioned outlet ports formed in the annulus 70, the volume of material per unit time or per unit distance travelled, assuming a constant speed of travel, being governed by turning the ring 71 carrying the masking plates 72 relative to the annulus 70 until an effective cross-sectional area of the outlet ports corresponding to the desired rate of distribution is reached. This is done by moving the lever 78 to an appropriate mark along the scale 80 and tightening the clamp incorporated in the pointer carried by said lever to maintain this setting.

The annulus 70 and ring 71 can be turned together about their common longitudinal axis without turning one of them relative to the other by removing the locking pin 85 and sliding the bracket 81 carrying the whole adjusting member 73 to a new position along the guide 82 and subsequently replacing the locking pin 85 in a fresh pair of the holes 84. The adjustment which has just been described angularly displaces both the outlet ports and the masking plates 72 around the longitudinal axis of the output shaft 16, this axis corresponding to the common longitudinal axis of the annulus 70 and ring 71, and so alters the angular setting about said axis at which the material from the hopper 30 will fall onto the rotary ejector 17. This, in turn, changes the position of the strip of land upon which the ejected material falls relative to the path of travel of the implement and its propelling tractor or other vehicle.

The screening strip 89 prevents any material spread forwardly of the implement from striking the tractor or other vehicle which is supporting it while the relatively narrower strip 88 serves as a safety guard preventing the blades of the ejector 17 from striking persons operating the implement or any relatively stationary objects. The connecting bracket 20 may be employed to draw a trailer, containing a bulk supply of material to be spread, behind the implement. When the area of land to be covered with material is reached, the trailer can be disconnected and left at a convenient point for periodically refilling the hopper 30.

In order to enable the various parts of the implement that have been described to be easily cleaned, the hopper 30 can be moved from the operative position shown in FIGURE 1 to the position which is illustrated in FIGURE 6. It will be evident that, in this latter position, the outlet portion 69 of the hopper 30, the annulus 70 and the ring 71 are readily accessible. The annulus 70 and ring 71 can be disconnected from their respective coupling rods 76 and 77 and lifted off the rotary ejector 17 if required.

When the previously mentioned clamping mechanism occupies the position illustrated in FIGURES 4 and 5, the spring 67 holds the transverse pin 63 in the notches 68 of the bracket 46. The spring 67 also exerts a force on the base of the bracket 57 that acts in the direction indicated by the arrow 91 in FIGURE 5. As can also be seen in FIGURE 5, the common longitudinal axis 92 of the pin 62 and spring 67 passes to one side of the longitudinal axis of the relatively perpendicular pivot pin 55. FIGURE 5 indicates the relative spacing by showing a line 93 that intersects the longitudinal axis of the pin 55 while extending parallel to the axis 92. By virtue of the relationship just described, the bracket 52 to which the lever 56 is secured is urged to turn about the pivot pin 60 in the direction indicated by the arrow 94 in FIGURE 5. The bracket 52 thus abuts against the strip 27 while the strip 27, in turn, abuts against the stiffening strip 33. The brackets 46 and 49 are also urged firmly into engagement with one another by virtue of the fact that the clamping mechanism is mounted on the pin 55 carried by the bracket 49. In this position of the clamping mechanism, which corresponds to the operative position of the implement which is illustrated in FIGURE 1 of the drawings, the pin 39 is held at the lowermost end of the slots 38 formed in the lugs 36 and 37.

The hopper 30 can be brought from the stable operative position that is illustrated in FIGURE 1 to the inoperative position illustrated in FIGURE 6, which is also stable, by turning the lever 56 about the pivot pin 60 in a direction opposite to the direction indicated by the arrow 94 in FIGURE 5 against the action of the spring 67. Shortly after the longitudinal axis of the pin 55 has crossed the axis 92, the transverse pin 63 reaches the ends of the slots 64 and 65 furthest from the base of the bracket 57 and the transverse pin 63 can then be lifted out of the notches 68 so that the spring 67 no longer exerts any pressure on the bracket 46. The pin 39 can then be turned with the aid of the handle 40 in the direction indicated by the arrow 95 in FIGURE 1 so that the corners 45 of the lifting arms 41 and 41A roll over the plate 4 until the straight edges 44 bear against said plate as illustrated in FIGURE 6. The turning movement just described raises the pin 39 in the slots 38 thus lifting the whole hopper 30 to a position in which the lowermost end of its outlet portion 69 is at approximately the same level as the uppermost edge of the annulus 70. The distance which the hopper is raised is thus approximately equal to the longitudinal overlap between the annulus 70 and the outlet portion 69 when the hopper 30 is in its operative position. The hopper 30 is raised approximately vertically so that it is not appreciably displaced relative to the starting position of its own longitudinal axis 30A which axis is substantially coincident with the longitudinal axis of the output shaft 16 when the hopper 30 occupies its operative position. After raising the hopper 30 with the aid of the handle 40, the whole hopper can be turned manually about the pin 39 in the direction indicated by the arrow 96 in FIGURE 6 until it reaches the position shown in that FIGURE. The end 19 of the lever 56 serves as a stop and is entered between the limbs of the bracket 46 beneath the stiffening strip 33. The lever 56 cannot turn further in a clockwise direction as seen in FIGURE 6 because the limbs of the bracket 57 bear against the uppermost edge of the strip 27 and prevent such movement.

The construction which has been described enables a hopper which is too large and/or too heavy to be readily manually removed from a spreading implement to be mounted in such a way that is can be brought without difficulty from an operative position to a position in which those parts that require cleaning are readily accessible. As can be seen in FIGURES 1 and 6, the hopper 30 is located closer to the rotary ejector 17 when it occupies its operative position than when it occupies the position that is suitable for cleaning of the implement.

What I claim is:

1. An agricultural implement comprising a container, a frame and a spreader, said container being supported by said frame at two vertically spaced supporting points, and said spreader being mounted on said frame below said container, the lower supporting point comprising release means for disconnecting said container from said frame, the upper supporting point comprising lifting means for raising said container relative to said spreader whereby said container can be raised and pivoted about said lifting means free from said spreader, said container being displaceably mounted and retainable on said frame in two different positions.

2. The invention of claim 1 wherein the container is displaceable with said lifting means in a substantially vertical direction.

3. The invention of claim 1 wherein the release means comprises a clamping mechanism which includes a first clamping member connected to the frame, a second clamping member connected to the container and a spring for urging said clamping members into engagement with one another.

4. The invention of claim 3 wherein said clamping members are U-shaped brackets and the bracket connected to said container is located above the bracket carried by said frame.

5. The invention of claim 3 wherein the mechanism includes two relatively movable parts, the first of said parts being pivotally connected to the first clamping member and the second of said parts being pivotally connected to said first part and carrying said spring.

6. The invention of claim 5 wherein each of said parts is U-shaped, said first clamping member and said spring being located on opposite sides with respect to said second clamping member.

7. The invention of claim 6 wherein the spring is a compression spring that surrounds a pin, one end of said pin being displaceably entered in a hole formed in the base of the U of said second part, the other end of said pin being connected to a laterally extending member supported in slots located in the limbs of the U of said second part, said spring exerting force between the laterally extending member and the base of the U, whereby said first part is held in a toggle arrangement with said second part, the pivot connection between said first and said second parts being offset relative to said laterally extending member.

8. The invention of claim 5 wherein the first part is pivotally connected to the clamping member carried by the frame.

9. The invention of claim 7 wherein the first part of the clamping mechanism is connected to a toggle lever for releasing said clamping members.

10. The invention of claim 1 wherein the spreader includes an annulus and the container has an outlet portion which fits within said annulus in operative position, said annulus being turnable about said portion and having at least one outlet port, said container being vertically displaceable through a distance sufficient for said portion to be completely withdrawn out of said annulus.

11. An agricultural implement comprising a container, a frame and a spreader, said spreader being supported by said frame, said container being pivotably mounted on the frame so as to be displaceable in a substantially vertical direction and retainable on said frame in two different positions whereby the container is located at a greater distance from the spreading member in one of said positions than in the other, said frame having a supporting plate, a turnable shaft having eccentric lifting arm means bearing on said plate, said shaft being connected to said container whereby said arm means is rotated on said plate as said shaft is turned and said container is raised in a substantially vertical direction.

12. The invention of claim 11 wherein the container is pivotally mounted on the frame on a substantially horizontal axis.

13. The invention of claim 11 wherein the frame includes two main beams, portions of said main beams located on relatively opposite sides of the container, the upper parts of said beams being rigidly interconnected by a supporting plate located adjacent said shaft, said beams diverging downwardly from said supporting plate whereby their uppermost ends at least partly support said container, a frame element connected to said two frame beams adjacent their lowermost ends, said element extending generally horizontally to support the spreading member.

14. The invention of claim 11, wherein the lever is turnable about its axis so as to extend upwardly whereby the clamping members are free from one another, said lever being adapted to be used as an adjustable stop for the container in said upwardly extending position whereby the container is located in said one of the two positions in which it is free from the spreader, and whereby said lever retains the container in said latter position.

15. The invention of claim 14 wherein the first clamping member bears against the stop when the container is held thereby.

16. The invention of claim 13 wherein said element is located beneath the spreader and is of U-shaped configuration, the ends of the limbs of said element being secured to corresponding limbs of said two main frame beams.

17. The invention of claim 16 wherein a U-shaped supporting member for the container is secured to said two main frame beams, the curved base of said member being located between said beams, the limbs of the supporting member being located above said frame element and extending in approximately the same direction as said element.

18. The invention of claim 17 wherein the two limbs of the U-shaped supporting member extend parallel to one another and are interconnected at their free ends by a strip.

19. The invention of claim 18 wherein at least one connecting strip extends between the strip interconnecting the free ends of the supporting member and the uppermost ends of the two main frame beams.

20. The invention of claim 17 wherein the two limbs are interconncted at their free ends by a connecting member, release means provided on said connecting member for connecting and disconnecting said container to and from said frame.

21. An agricultural implement for spreading powdery or granular material comprising a frame, a container for said material mounted on the frame, a spreader arranged on the frame below said container, said container having an outlet portion with a discharge opening communicating with said spreader, said container hingeably connected to the frame and being movable in a first position wherein the discharge opening is away from said spreader to permit cleaning of said spreader and is movable into a second position wherein the discharge opening is in communication with the spreader and the container is supported by the frame, the hingeable connection of the container being situated at a level above the discharge opening of the container, locking means to connect the container to the frame against moving about said hingeable connection, said locking means including a first member on said container and a second member interconnected to the frame operatively associated with said first member to retain said container in locked position, said first and second members being separated in unlocked position.

22. The implement of claim 21 wherein the locking means is located above the discharge opening of the container.

23. An implement as claimed in claim 21, wherein the frame is provided with hitch means for connecting the implement to the three-point hitch of a tractor.

24. An implement as claimed in claim 23, wherein the uppermost hitch means for connecting the implement to the three-point hitch of a tractor is located near said hingeable connection between the container and the frame.

25. An implement is claimed in claim 21, wherein a pair of horizontally disposed supporting portions are provided on the frame for supporting the container.

26. An implement as claimed in claim 25 wherein the horizontally disposed supporting portions are located above the spreader and release means for said locking means is positioned adjacent the ends of said supporting portions.

27. An implement as claimed in claim 26 wherein a bar is provided between the ends of said supporting portions, said release means at least in part cooperating with said bar for fixing said container to the frame.

28. An implement as claimed in claim 21 wherein a releasing arm is connected to the locking means and the releasing arm comprises a stop for the container in unlocked position.

29. The implement of claim 21 wherein the hingeable connection of the container is situated at the front side of the implement.

References Cited by the Examiner

UNITED STATES PATENTS

| | | | |
|---|---|---|---|
| 480,304 | 8/1892 | Waterman | 111—63 |
| 2,923,574 | 2/1960 | Fuss et al. | 275—15 X |
| 3,025,068 | 3/1962 | Van der Lely et al. | 275—15 X |

FOREIGN PATENTS

| | | |
|---|---|---|
| 1,250,154 | 11/1960 | France. |
| 1,312,850 | 11/1962 | France. |
| 683,299 | 11/1952 | Great Britain. |
| 940,423 | 10/1963 | Great Britain. |

ABRAHAM G. STONE, *Primary Examiner.*

J. R. OAKS, *Assistant Examiner.*